(12) United States Patent
Schibsbye

(10) Patent No.: US 8,919,754 B2
(45) Date of Patent: Dec. 30, 2014

(54) INFLATABLE DORN

(75) Inventor: Karsten Schibsbye, Fredericia (DK)

(73) Assignee: Siemens Aktiengesellschaft, Munich (DE)

(*) Notice: Subject to any disclaimer, the term of this patent is extended or adjusted under 35 U.S.C. 154(b) by 861 days.

(21) Appl. No.: 13/040,630

(22) Filed: Mar. 4, 2011

(65) Prior Publication Data

US 2011/0233837 A1 Sep. 29, 2011

(30) Foreign Application Priority Data

Mar. 25, 2010 (EP) .................... 10157730

(51) Int. Cl.
| | | |
|---|---|---|
| *B23Q 3/00* | (2006.01) | |
| *B65C 3/26* | (2006.01) | |
| *B32B 37/00* | (2006.01) | |
| *B29C 33/50* | (2006.01) | |
| *B29C 70/44* | (2006.01) | |
| *B29D 99/00* | (2010.01) | |
| *B29L 31/08* | (2006.01) | |

(52) U.S. Cl.
CPC ............ *B29C 33/505* (2013.01); *B29C 70/446* (2013.01); *B29D 99/0028* (2013.01); *B29L 2031/082* (2013.01)
USPC .............. 269/20; 156/156; 156/229

(58) Field of Classification Search
USPC .............. 269/20, 21, 55; 254/93 HP; 29/252, 29/281.1
See application file for complete search history.

(56) References Cited

U.S. PATENT DOCUMENTS

| | | | |
|---|---|---|---|
| 3,942,753 A | 3/1976 | Sachs | |
| 5,259,901 A | 11/1993 | Davis et al. | |
| 6,596,121 B1 * | 7/2003 | Reynolds, Jr. | ............... 156/294 |
| 8,293,051 B2 * | 10/2012 | Morris et al. | ................. 156/156 |
| 2005/0211843 A1 * | 9/2005 | Simpson et al. | ............. 244/119 |
| 2007/0175577 A1 * | 8/2007 | Dagher et al. | ................ 156/229 |
| 2010/0139850 A1 | 6/2010 | Morris et al. | |

FOREIGN PATENT DOCUMENTS

| | | |
|---|---|---|
| EP | 2 145 751 A1 | 1/2010 |
| GB | 2 031 330 A | 4/1980 |
| WO | WO 2008/112298 A1 | 9/2008 |

* cited by examiner

*Primary Examiner* — Lee D Wilson
*Assistant Examiner* — Nirvana Deonauth

(57) ABSTRACT

A mandrel for producing a fiber-reinforced composite part, in particular a blade for a wind turbine is disclosed. The mandrel includes an expandable body with an outer surface onto which a fiber material of the fiber-reinforced composite part is layable out. The expandable body is expandable in an expanded state, wherein in the expanded state the outer surface forms an interior shape of the fiber-reinforced composite part to be produced. Moreover, the expandable body is collapsible in a collapsed state.

5 Claims, 1 Drawing Sheet

INFLATABLE DORN

CROSS REFERENCE TO RELATED APPLICATIONS

This application claims priority of European Patent Office application No. 10157730.2 EP filed Mar. 25, 2010, which is incorporated by reference herein in its entirety.

FIELD OF INVENTION

The present invention relates to a mandrel for producing a fibre-reinforced composite part, in particular a blade for a wind turbine. Moreover, the present invention relates to a method of producing a fibre-reinforced composite part, in particular a blade for a wind turbine, by using a mandrel.

ART BACKGROUND

In conventional manufacturing processes for fibre-reinforced composite parts, fibre material is laid out onto a rigid and inflexible dorn or mandrel. Next, the dorn with the fibre material is placed in a female mould part. The dorn has the function of supporting the fibre material, such as glass fibre material, in the mould part during a casting process in a predefined position and shape. The predefined position and shape of the fibre material onto the dorn is substantially equal to the desired position and shape of a finished fibre-reinforced composite part to be produced.

In particular, sheets of prepreg material may be wrapped around a steel or aluminum mandrel. The fibre-reinforced composite part to be produced is typically batch cured by hanging in an oven. After curing, the mandrel is removed and leaves a hollow fibre-reinforced composite part. Such a process may form strong and robust hollow fibre-reinforced composite tubes, for instance.

If the interior shape of the fibre-reinforced composite part comprises at its edge regions smaller diameters in comparison to other regions of the interior shape, it is difficult to withdraw the dorn after the casting process.

In particular, if producing a large sized blade for wind turbines, a rigid and solid dorn is difficult to withdraw after the cast process. The processed blade comprises only a small opening at its blade root through which the dorn may be removed. Thus, depending on the shape of the rotor blade, the dorn has to comprise a disproportional high amount of flexible material compared to the solid part of the dorn. This is a disadvantage, because the flexible material may inappropriately deform during the casting process, e.g. under the weight of the fibre material laid out onto the surface of the flexible material of the rigid dorn. Moreover, such a dorn with a solid core and a huge amount of flexible material is difficult to handle in particular during storage.

SUMMARY OF THE INVENTION

It may be an object of the present invention to improve the handling abilities of a dorn and to provide a more efficient manufacturing method for producing a fibre-reinforced composite part.

This object may be solved by a mandrel for producing a fibre-reinforced composite part, in particular a blade for a wind turbine and by a method of producing a fibre-reinforced composite part, in particular a blade for a wind turbine, by using a mandrel according to the independent claims.

According to a first aspect of the present invention a mandrel (e.g. a dorn) for producing a fibre-reinforced composite part, in particular a blade for a wind turbine, is described. The mandrel comprises an expandable body with an outer surface onto which a fibre material of the fibre-reinforced composite part to be produced is layable out. The expandable body is expandable in an expanded state, wherein in the expanded state the outer surface forms an interior shape of the fibre-reinforced composite part to be produced. The expandable body is collapsible in a collapsible state.

According to a further exemplary embodiment, a method of producing a fibre-reinforced composite part, in particular a blade for a wind turbine, by using a mandrel is provided. According to the method, an expandable body of the mandrel is expanded in an expanded state, so that an outer surface of the expandable body forms an interior shape of the fibre-reinforced composite part to be produced. Next, fibre material of the fibre-reinforced composite part is laid out onto the outer surface. Moreover, the expandable body is collapsed in a collapsible state.

The term "mandrel" denotes a fabrication item to which winding filaments, fibres or fibre mats may be wrapped around. The mandrel may also be called dorn or male mould. The mandrel onto which the fibre material is wrapped around is placeable into a female mould or a split mould. Between the mandrel and the female mould or split mould the fibre material may be further compressed and cured, e.g. by applying heat and pressure.

The fibre material of the fibre-reinforced composite part may comprise in particular mineral fibres and polymer fibres. The fibre material may thus comprise fibre glass, metallic fibres or carbon fibres. Moreover, the fibre material may comprise all kind of polymer fibres, such as aromatic polyamides, polyethylene, polyurethane or aramide fibres. The fibre material may comprise different types of fibre materials and may form a composite material. The fibres may be laid onto the outer surface of the expandable body of the mandrel in the form of unidirectional or multidirectional fibres, prepregs, fibre boards or fibre mats.

The expandable body of the mandrel denotes a section or a region of the mandrel that is deformable, in particular expandable and collapsible. Thereby, the expandable body is in the expanded state a rigid and solid, substantially without elastic characteristics and is not deformable due to the exertions of pressure during the curing process, for example. The stiffness of the expandable body in the expanded state may be established by providing an inner (air) pressure, by unfolding reinforcing elements or by unfolding a framework. In the collapsed state, the expandable body comprises a smaller volume as in the expanded state. The smaller volume is created by collapsing (e.g. by draining off air or folding) the expandable body. The material of the expandable body may be a foldable or ductile material. The material of the outer surface of the expandable body is heat-resistant up to temperatures around 80° to 120° degrees Celsius. Normally the resin, e.g. the epoxy, is heated up between 80° to 120° degrees Celsius during curing. If the laminate and the resin are solid, the exothermic heat will be raised about 120° degrees Celsius.

By the present invention a mandrel is described, wherein the mandrel comprises an expandable body that is made of a suitable robust and deformable material, such as rubber material or deformable coated woven material. In the expanded state, the expandable body forms an interior shape (i.e. a negative form or a female mould) of the fibre-reinforced composite part to be produced. Thus, in the expanded state the fibre material may be laid onto the outer surface of the expandable body. The outer surface may form a variety of desired shapes (negative forms), substantially equal to the desired interior shape of the fibre-reinforced composite part to be produced. After finishing the step of laying out the fibre material onto the outer surface of the expandable body, the fibre material is cured for producing the fibre-reinforced composite part. During the curing process, the mandrel is positioned inside a female mould part and a pressure to the fibre material is exerted.

After curing of the fibre-reinforced composite part, the expandable body may be collapsed in the collapsed state. Thus, the mandrel, in particular the expandable body, comprises a smaller volume than in the expanded state and is removable from the interior of the produced fibre-reinforced composite part. In particular, when producing for instance a blade for a wind turbine, after casting of the blade only an inflexible small opening at the blade root is provided. In the collapsed state, the mandrel is removed easily from the produced blade without the need of destroying or disassembling the mandrel. Thus, a more effective producing process for fibre-reinforced composite parts is achieved. Moreover, in the collapsed state, the mandrel provides a very small volume, so that an easy and efficient storage ability of the mandrel is achieved.

According to a further exemplary embodiment, the expandable body comprises a hull, wherein the expandable body is expandable by pumping air into the hull. Thus, by the present invention the expandable body is inflatable by pumping air inside. The hull forms in particular a cavity inside the expandable body. Moreover, in the further exemplary embodiment the expandable body is collapsible by exhausting air outside the hull or the cavity, respectively.

By pumping air into the cavity of the hull of the inflatable and expandable body, an easy mechanism for expanding the expandable body is achieved. Further mechanical mechanisms for expanding the body or for collapsing the expandable body are not necessary.

According to a further exemplary embodiment the hull comprises at least an air inlet adapted for being connected to an air pump. In particular, the air inlet may comprise a quick coupling, in particular a standardized quick coupling, so that a variety of different air pumps may be connected efficiently to the respective air inlet.

According to a further exemplary embodiment the hull comprises a plurality of air-tight chambers. Each of the plurality of the air-tight chambers may comprise an air inlet adapted for being connected to an air pump. When providing a plurality of air-tight chambers, each air-tight chamber may be inflated individually. Thus, the rigidity or hardness of each air-tight chamber may be adjusted for each air-tight chamber individually. In particular, for certain components, it may be advantageous if a section of the mandrel may be kept flexible and softer in comparison to other sections that are pumped up with a high air pressure for providing a hard and robust section.

Moreover, the problem with conventional mandrel foam is that the foam is shrinking when applying heat and low pressure. The heat and the vacuum in the manufacturing process leads to a deformation of a shape of the conventional mandrels. Thus, the conventional mandrels may be unintentionally removed from the composite part during the casting and curing. Moreover, the heat and the vacuum wear out the foam. By the claimed expandable body, the shape of the expandable body is simply adjustable by controlling the air feeding. Moreover, with the conventional mandrels there is a risk that the fibre material is trapped between the female mould parts. By the adjustable expandable body, the expandable body is shrinkable by draining of air during the closing of the (female) moulds, so that the volume is reduced and the risk of pinching the fibre material between mould parts is reduced.

After the closing of the mould parts, the expandable body may be expanded again to its desired shape and volume.

By providing the air inlets with quick couplings, each air-tight chamber may be inflated by using only one air pump or by using a plurality of air pumps that inflates each air-tight chamber at the same time. Thus, the expanded state of the expandable body may be formed fast. The air flow and the air pressure inside the air-tight chambers may be separately controlled, e.g. by the connection of separate air pressure pumps.

According to a further exemplary embodiment, the expandable body comprises the hull and a foldable framework. The foldable framework is located in the hull in such a way, that the expandable body is expandable by unfolding the foldable framework and the expandable body is collapsible by folding the foldable framework. By providing the framework inside the expandable body, the expandable body may be more rigid and stiff in comparison to an inflated expandable body by air. Thus, if it is necessary to exert a high outer pressure to some sections of the fibre-reinforced composite part during processing, the framework may hold a stable shape of the mandrel in the expanded state.

The folding and the unfolding of the foldable framework may be controlled by tackle mechanism or by electronic, hydraulic or pneumatic actuators. Moreover, the hull may be adapted for being pumped up with air as described above and may additionally comprise the described framework.

According to a further exemplary embodiment, the mandrel further comprises a spacer element installed in the hull. The spacer element is connected to two inner surfaces, in particular to two separate regions of the inner surface of the hull for defining a predetermined distance between the two inner surfaces in the expanded state. Thus, in the expanded state a predefined shape of the expandable body may be defined. In particular, when unfolding the framework or when pumping air inside the hull, predefined regions of the two inner surfaces may be kept at a defined maximum distance by the spacer elements with respect to other sections and surfaces of the expandable body. In particular, the spacer elements define a maximum distance between two inner surfaces in the expanded state. Additionally, the spacer elements may define a minimum distance of two inner surfaces. In particular when a high pressure is exerted from the outside to the expandable body, the spacer elements may space the two inner surfaces at a defined minimum distance and reinforce the predetermined shape of the hull.

In other words, the mandrel comprises the spacer elements to ensure the correct formation of the mandrel when expanded, i.e. inflated. The distance between two opposite sides or inner surfaces of the expandable body is kept to a specific level as the spacer elements prohibit the inner surfaces to move away from each other more than in a certain distance equal to the length of the spacer element.

According to a further exemplary embodiment of the method the fibre material is processed after the step of laying out the fibre material to the outer surface. The step of processing may provide a curing step of the fibre material, wherein in the curing step high temperature and high pressure is exerted to the fibre material and the mandrel.

According to a further exemplary embodiment, during the step of processing (e.g. curing), the expandable body is expandable and/or collapsible. Thus, in order to achieve certain material characteristics of the fibre-reinforced composite part, such as elasticity, flexibility or rigidity, it is advantageous to alternate the volume and the rigidity of the expandable body. Moreover, shape changes of the expandable body caused by the applied temperature or pressure are balanced by expanding or collapsing the expandable body.

According to a further exemplary embodiment of the method, the step of processing comprises applying a bag around the mandrel for providing a closed zone around the mandrel and generating a low pressure (e.g. a vacuum) between the bag and the mandrel. In particular, the fibre materials are glued together by resin. The excessive resin is drawn off by generating a low pressure. This low pressure may be achieved by attaching the bag around the mandrel and by forming the closed zone around the mandrel.

The bag, in particular the plastic bag, may be applied around the mandrel. This is to ensure that a closed chamber can be formed and the low pressure can be applied to the layers of the fibre material, such as fibre glass material, when situated between the mandrel and the (female) mould.

By the present invention the mandrel is usable for producing a fibre-reinforced blade for a wind turbine. Such a blade comprises in general large dimension and complex shapes. In particular, a blade of a wind turbine comprises a closed volume with a small opening at the blade root. The length of a blade from its root to its blade tip may be more than 2 m (meter). Today's blades may reach a length from its root to its blade tip of approximately 50 m to 70 m (meter). The diameter inside the blade (e.g. 2 m to 6 m) is in general larger than the diameter of the small opening of the blade (e.g. 0.5 m to 3 m). Thus, by the inventive mandrel, the expandable body of the mandrel may be expanded till the outer surface of the expandable body is adapted to a desired interior shape with a large diameter of the blade to be produced. In a next step, after processing the blade, the expandable body may be collapsed for providing a smaller diameter, wherein in the collapsed state the mandrel may be extracted through the small opening at the blade root. Thus, a time-consuming demounting is not longer necessary.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
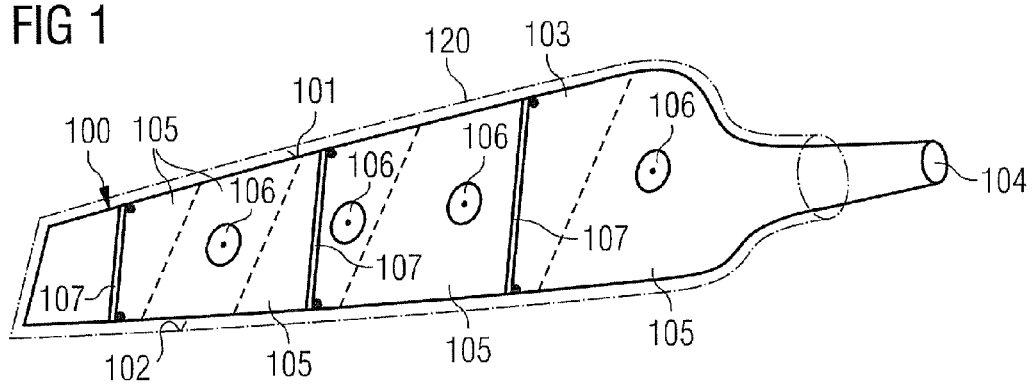
FIG. 1 shows a mandrel with an expandable body in an expanded state according to an exemplary embodiment of the present invention.

The illustrations in the drawings are schematic. It is noted that in different figures, similar or identical elements are provided with the same reference signs.

Figure 2:
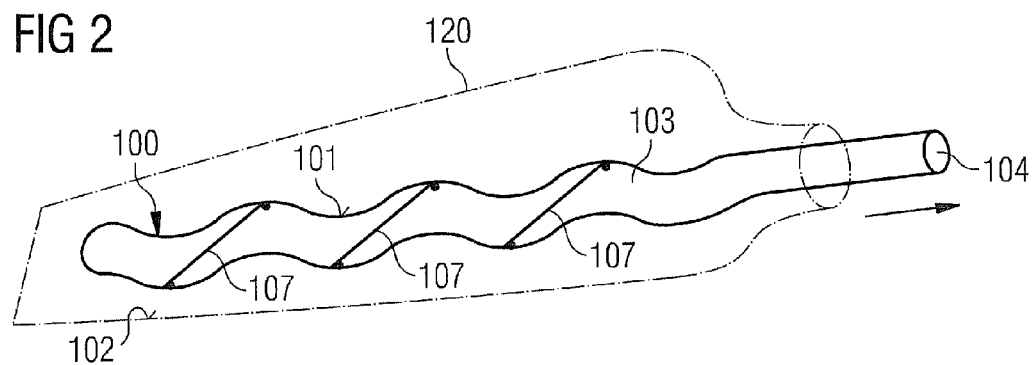
FIG. 2 shows a mandrel with an expandable body in a collapsed state according to an exemplary embodiment of the present invention.

FIG. 1 shows a mandrel for producing a fibre-reinforced composite part 120. As shown in FIG. 1, the fibre-reinforced composite part 120 is for instance a blade for a wind turbine. The mandrel comprises an expandable body 100 with an outer surface 101 onto which a fibre material, such as a composite material made of aramide or glass fibre, is laid out. The expandable body 100 is expandable in an expanded state wherein in the expanded state the outer surface 101 forms an interior shape 102 of the fibre-reinforced composite part 120 to be produced. Moreover, the expandable body 100 is collapsible in a collapsed state which is shown in FIG. 2.

In FIG. 1, the fibre-reinforced composite part 120 is a blade. The fibre-reinforced composite part 120 comprises a volume which comprises a large diameter and an opening with a smaller diameter. The expandable body 100 of the mandrel is expanded, e.g. by pumping air inside the hull 103 of the expandable body 100. Inside the hull 103 a foldable framework may be additionally or alternatively installed, whereby in the expanded state of the expandable body 100 the foldable framework is unfolded.

In the expanded state, the outer surface 101 of the expandable body 100 may form the interior shape 102 of the fibre-reinforced composite part 120. In particular, the outer surface 101 forms the male mould or negative mould with respect to the interior shape 102 of the fibre-reinforced composite part 120 to be produced.

In order to define a predefined distance of defined regions of the inner surface of the expandable body 100, spacer elements 107 with a predefined length are installed inside the hull 103 of the expandable body 100. By the spacer elements 107, a predefined distance and thus a predefined shape of the outer surface 101 of the expandable body 100 may be formed.

As can be seen in FIG. 1, the hull 103 of the expandable body 100 is separated by a plurality of air-tight chambers 105. The hull 103 comprises an air inlet 103, whereby also each of the air-tight chambers 105 may comprise a further air inlet 106. Thus, the shape of the expandable body 100 may be altered during the process of curing the fibre-reinforced composite part 120. In other words, the air pressure inside the expandable body 100 and in the air-tight chambers 105 may be altered.

FIG. 2 shows the expandable body 100 in the collapsed state. After processing, e.g. after curing of the fibre-reinforced composite part 120, a conventional mandrel would have to be dismounted or destroyed in order to pull out the conventional mandrel from the fibre-reinforced composite part 120. With the inventive mandrel, the expandable body 100 may be collapsed, so that the volume of the expandable body 100 is reduced with respect to the volume of the expandable body 100 in the expanded state. In this collapsed state, the mandrel may be easily pulled out from the interior of the produced fibre-reinforced composite part 120.

As can be seen in FIG. 2, the spacer elements 107 may be collapsed as well. The hull 103 may comprise the reduced volume in the collapsed state as well.

Figure 3:
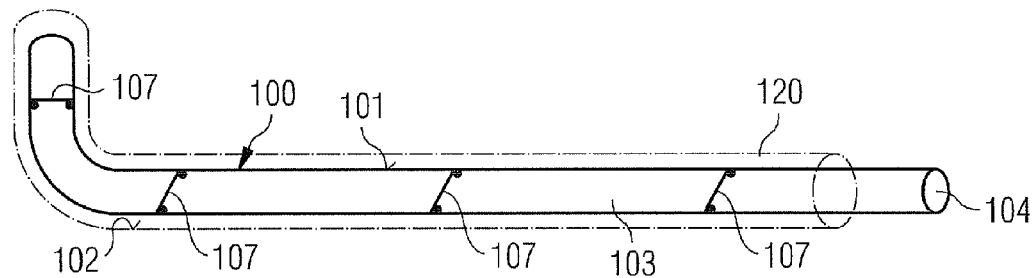
FIG. 3 shows a blade for a wind turbine with a winglet that is produced by the mandrel according to an exemplary embodiment of the present invention.

FIG. 3 illustrates a complex fibre-reinforced composite part 120 that is formable by the mandrel. The fibre-reinforced composite part 120 as shown in FIG. 3 is a blade with a small opening on the one side and a winglet on the other side. In order to provide the exact complex interior shape 102 of the blade, spacer elements 107 are installed in the hull 103 of the expandable body 100. When the expandable body 100 is in the expanded state, the outer surface 101 of the expandable body 100 forms the interior shape 102 of the blade including the shape of the winglet. After wrapping around the fibre material around the outer surface 101 of the mandrel and after curing the fibre material, the expandable body 100 is collapsed into the collapsed state. In the collapsed state, the outer surface 101 is separable from the interior shape 102 of the blade. For generating the collapsed state of the expandable body 100, air may be sucked out of the hull 103 by opening an air inlet 104 that is attached to the expandable body 100. In this collapsed state, the mandrel may be easily pulled out of the formed blade. Because the expandable body 100 is flexible, bendable and ductile, the mandrel may be pulled out even when the blade comprises complex shapes, such as a shape of a winglet. In particular, by the mandrel with the expandable body 100 complex shapes, e.g. with undercuts, may be formed. In particular, if interior shapes 102 with undercuts are formed, the expandable body 100 of the mandrel may be pulled off easily as well.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A mandrel for producing a fibre-reinforced composite part, which is a blade for a wind turbine, wherein the mandrel comprises:
    an expandable body with an outer surface onto which a fibre material of the fibre-reinforced composite part is layable out,
    wherein the expandable body is expandable in an expanded state, wherein in the expanded state the outer surface forms an interior shape of the fibre-reinforced composite part to be produced,
    wherein the expandable body is collapsible in a collapsed state,
    wherein the expandable body comprises a hull,
    wherein the expandable body is expandable by pumping air into the hull,
    a plurality of spacer elements installed in the hull,
    wherein each spacer element is independently connected to two separate regions of the inner surfaces of the hull for defining a predetermined distance between the two separate regions of the inner surfaces in the expanded state, and
    wherein the spacer elements are not in contact with each other in the expanded state of the expandable body.

2. The mandrel of claim 1, wherein the expandable body (100) is collapsible by exhausting air outside the hull.

3. The mandrel of claim 1, wherein the hull comprises at least an air inlet adapted for being connected to an air pump.

4. The mandrel of claim 1,
    wherein the hull comprises a plurality of air-tight chambers, and
    wherein each of the plurality of air-tight chambers comprises an air inlet adapted for being connected to an air pump.

5. The mandrel of claim 1,
    wherein the expandable body comprises the hull and a foldable framework,
    wherein the foldable framework is located in the hull in such a way, that the expandable body is expandable by unfolding the foldable framework and the expandable body is collapsible by folding the foldable framework.

* * * * *